(12) United States Patent
Bruekers et al.

(10) Patent No.: US 8,509,494 B2
(45) Date of Patent: Aug. 13, 2013

(54) BIOMETRIC INFORMATION DETECTION USING SWEEP-TYPE IMAGER

(75) Inventors: Alphones Antonius Maria Lambertus Bruekers, Nedersweert (NL); Marijn Damstra, Eindhoven (NL); Cristian C. Presura, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 685 days.

(21) Appl. No.: 12/097,772

(22) PCT Filed: Dec. 20, 2006

(86) PCT No.: PCT/IB2006/054983
§ 371 (c)(1),
(2), (4) Date: Jun. 4, 2009

(87) PCT Pub. No.: WO2007/072447
PCT Pub. Date: Jun. 28, 2007

(65) Prior Publication Data
US 2011/0096961 A1 Apr. 28, 2011

(30) Foreign Application Priority Data
Dec. 21, 2005 (EP) ..................................... 05112586

(51) Int. Cl.
*G06K 9/00* (2006.01)
*G06K 9/40* (2006.01)
*G06K 9/32* (2006.01)

(52) U.S. Cl.
USPC ............................. 382/115; 382/254; 382/294

(58) Field of Classification Search
None
See application file for complete search history.

(56) References Cited

U.S. PATENT DOCUMENTS

| | | | |
|---|---|---|---|
| 6,241,288 B1 | 6/2001 | Bergenek et al. | |
| 6,303,921 B1 | 10/2001 | Hastings et al. | |
| 2003/0123714 A1 | 7/2003 | O'Gorman et al. | |
| 2005/0105782 A1* | 5/2005 | Abiko | 382/124 |
| 2005/0111708 A1 | 5/2005 | Chou | |
| 2005/0129291 A1* | 6/2005 | Boshra | 382/124 |
| 2005/0152584 A1* | 7/2005 | Svedin | 382/124 |
| 2005/0226479 A1 | 10/2005 | Takahashi | |
| 2005/0238211 A1 | 10/2005 | Du et al. | |
| 2005/0238212 A1 | 10/2005 | Du et al. | |
| 2005/0244039 A1 | 11/2005 | Geoffroy et al. | |
| 2005/0280714 A1* | 12/2005 | Freeman | 348/219.1 |
| 2006/0002597 A1* | 1/2006 | Rowe | 382/124 |
| 2007/0258629 A1* | 11/2007 | Bartsch et al. | 382/128 |

FOREIGN PATENT DOCUMENTS

| | | | |
|---|---|---|---|
| WO | 02061668 A1 | 8/2002 | |
| WO | 03007127 A2 | 1/2003 | |
| WO | WO03007127 | * | 1/2003 |

(Continued)

OTHER PUBLICATIONS

Yu et al, A Fingerprint Matching Algorithm Based on Radial Structure and a Structure-Rewarding Scoring Strategy, 2005, Springer-Verlag, AVBPA 2005, LNCS 3546, pp. 656-664.*

(Continued)

*Primary Examiner* — Bhavesh Mehta
*Assistant Examiner* — David F Dunphy

(57) ABSTRACT

A fingerprint recognition system in which a user's finger is scanned over a strip sensor until it is determined that sufficient image data samples have been obtained, then an indication is provided that the scanning operation is complete.

16 Claims, 6 Drawing Sheets

(56) References Cited

FOREIGN PATENT DOCUMENTS

| WO | 2004049254 A2 | | 6/2004 |
|---|---|---|---|
| WO | 2004090786 A2 | | 10/2004 |
| WO | 2005024706 A1 | | 3/2005 |
| WO | WO2005024706 | * | 3/2005 |
| WO | WO 2005/055429 | * | 6/2005 |
| WO | 2005106774 A2 | | 11/2005 |
| WO | WO2005106774 | * | 11/2005 |
| WO | 2007072447 A2 | | 6/2007 |

OTHER PUBLICATIONS

Deshpande, Super Resolution of Fingerprints, 2004, College of Engineering and Mineral Resources at West Virginia University, pp. 1-104.*

Maltoni D; "Handbook of Fingerprint Recognition, Passage", Handbook of Fingerprint Recognition, New York: Springer Verlag, US, 2003, pp. 65-69, XP002355942.

* cited by examiner

BIOMETRIC INFORMATION DETECTION USING SWEEP-TYPE IMAGER

This invention relates generally to a method and system for detecting biometric information, for example, a fingerprint recognition method and system using a sweep-type imager.

The automatic identification of people by means of biometric features has become possible as a result of the availability of inexpensive computers. The commonly used components used for recording the image of a fingerprint, for example, also referred to as fingerprint sensors, can divided into three groups:

1) Sensors with optical projection;
2) Flat sensors; or
3) Strip sensors.

In the case of sensors with optical projection, the image is taken from a clear, transparent surface on which the fingertip bears, and is imaged in a chip camera in a manner reduced in size by optics. The surface of the chip camera is only a fraction of the size of the bearing area. The costs resulting from the semiconductor material are therefore relatively low, but the cost of the optics is high. Moreover, a sensor based on this principle requires a size of a few centimeters.

Most widely used are flat sensors which have an image recorder of the size of a fingertip, the image recorder being produced on the basis of a semiconductor substrate. Areas of between about 14×18 mm and 22×25 mm are required. Regardless of the imaging principle used (measurement of local capacitance effects, electrical field change or optical recording), a considerable fraction of the cost is caused solely by the necessary chip surface as a support for the recording elements (pixels). Calculated for mass use, these costs are for example much higher than those resulting today for image-evaluating microprocessors.

In a third group, only much smaller recording surfaces are required, since the image of the fingertip is recorded sequentially in lines. The user moves their finger over the recording line sensor, which detects the fingerprint line by line as the movement progresses. These sensors require only a narrow strip of 15×1 mm to 20×3 mm chip surface, that is to say only a fraction of the semiconductor material, and are thus much more cost-effective. In practice, however, they have the significant disadvantage that unusable distorted images are often produced.

PCT application no. WO 2005/024706 describes a fingerprint detection system in which a strip sensor is used to record an image of a users' fingerprint, and an optoelectronic speed sensor is used to determine the finger movement during image capture by evaluating the Doppler shift of a modulation of the modulated laser light reflected at the moved finger surface. The determined finger movement is used to correct an image of the finger structure that has been distorted as a result of non-uniform movement.

If a sweep-sensor is used that has a sufficiently high spatial resolution, a single scan of the finger over the sensor will give sufficient image data to accurately reproduce an image of the fingerprint. However, in the case of many types of sensor, a single scan results in a low spatial resolution image.

The actual position of each sample in the image is the position of the cell at the sampling moment. In many systems, these are quantized to a (e.g. rectangular) grid of pixel positions to feed standard signal processing algorithms for further processing.

The spatial resolution of the image can be increased in the direction of the finger movement by increasing the sampling frequency or by decreasing the speed of the finger movement. Using multiple cells at a smaller distance distributed along a line can increase the spatial resolution in the direction perpendicular to the finger movement. In addition, a repeated scan also increases the spatial resolution in the direction perpendicular to the finger movement.

If the spatial resolution of the acquired image is low, interpolation of available samples may be used in order to obtain derived samples at special positions (e.g. during quantization). However, in general, it makes no sense to use interpolation in an area where little or no samples are available. It is still fundamental that samples should be spatially close, i.e. at every position data should be available. In other words, the horizontal and vertical resolution needs to be sufficiently high.

It is therefore an object of the present invention to provide a method and system for detecting biometric information from an image of a body part, in which it is ensured that a sufficient number and distribution of samples are acquired during the image acquision to reproduce an accurate image of the body part.

In accordance with a first aspect of the present invention, there is provided a method for detecting biometric information in respect of a user, comprising the steps of providing at least one sensor for providing image data samples representative of the structure of a user's body part when said body part is passed over said sensor, determining the number and location of data samples obtained in respect of said body part during a measurement operation, identifying whether or not sufficient data samples have been obtained during said measurement operation, and providing an indication accordingly.

Also in accordance with the first aspects of the present invention, there is provided a system for detecting biometric information in respect of a user, comprising at least one sensor for providing image data samples representative of the structure of a user's body part when said body part is passed over said sensor, means for determining the number and location of data samples obtained in respect of said body part during a measurement operation, means for identifying whether or not sufficient data samples have been obtained during said measurement operation and means for providing an indication accordingly.

Thus, the first aspect of the present invention provides means whereby the user is provided with an indication whether or not the scan is complete and sufficient data samples have been collected for the purposes of the measurement operation.

In one exemplary embodiment, an indication is simply provided when the measurement operation is complete. In addition or alternatively, however, an indication may be provided whilst the measurement operation is not complete as to an action required to be performed by a user in order to facilitate the measurement operation, e.g. "move hand to the left", "move slower", etc.

Preferably, a threshold value is defined which, when reached, indicates that sufficient data samples have been obtained during said measurement operation. In one exemplary embodiment, a Voronoi cell is defined around each sample obtained during a measurement operation and sufficient data samples are deemed to have been obtained during a measurement operation when the maximum distance between a sample and any of the vertices of said cell is less than or equal to a predetermined threshold value.

In an alternative exemplary embodiment, a series of regions are defined in relation to a scanned area and the number of data samples obtained in respect of each region is determined, to determine if sufficient data samples have been obtained for the purposes of the measurement operation. In this case, said regions may be overlapping and/or of varying sizes and/or shapes.

In yet another exemplary embodiment, a pixel map may be defined across an image of said body part acquired during said measurement operation, and the number of data samples obtained in respect of each of one or more regions of said pixel map is determined, to determine if sufficient data samples have been obtained for the purposes of the measurement operation.

Preferably, the method further comprises processing said image data samples to generate an image representative of said body part, including interpolating said data samples to compensate for any missing or incomplete data samples.

In one exemplary embodiment, the biometric information is used in user identification, such as fingerprint recognition, hard recognition or face recognition.

In accordance with a second aspect of the present invention, there is provided a method for detecting biometric information in respect of a user, comprising the steps of providing at least one sensor for providing image data samples representative of the structure of a surface of a user's body part when said body part is passed over said sensor, generating data representative of at least one sub-surface parameter in respect of said body part, generating image data representative of said structure of said surface of said body part from said image data samples, and performing user identification using in combination said image data representative of said structure of said surface of said body part and said image data representative of at least one sub-surface parameter in respect of said body part.

Also in accordance with the second aspect of the present invention, there is provided a system for detecting biometric information in respect of a user, comprising at least one sensor for providing image data samples representative of the structure of a surface of a user's body part when said body part is passed over said sensor, means for generating image data representative of at least one sub-surface parameter in respect of said body part, means for generating image data representative of said structure of said surface of said body part from said image data samples, and means for performing user identification using in combination said image data representative of said structure of said surface of said body part and said image data representative of at least one sub-surface parameter in respect of said body part.

In a preferred embodiment, said image data comprises two-dimensional image data representative of said at least one sub-surface parameter.

In a preferred embodiment, a speed sensor, preferably an optoelectronic speed sensor, is provided that (preferably continuously) determines movement of said body part relative to said sensor, and wherein said determined finger movement is used to correct said image representative of said at least one sub-surface parameter that has been distorted as a result of non-uniform movement.

Said at least one sub-surface parameter may be one or more of dissolved and bounded gases in the blood, vein structure and dermal papillae.

These and other aspects of the present invention will be apparent from, and elucidated with reference to, the embodiments described herein.

Embodiments of the present invention will now be described by way of examples only and with reference to the accompanying drawings, in which:

FIG. 6 illustrates schematically the resulting set of sample locations in the case where 3 cells are used at horizontal distance a;

Figure 1A:
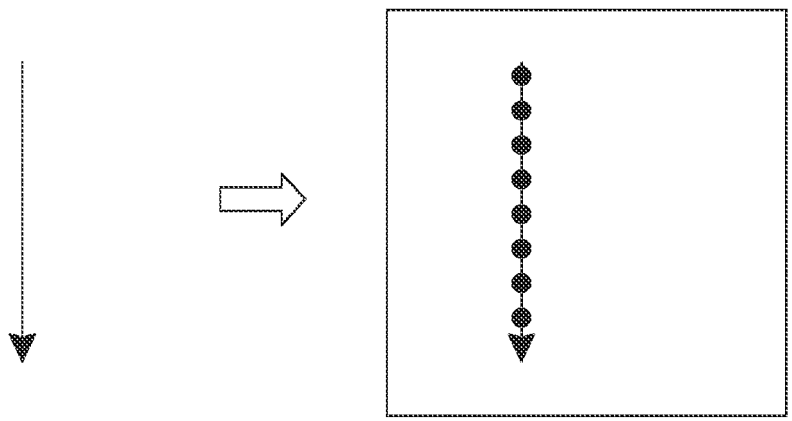
FIG. 1a illustrates schematically a finger scan and related set of sample locations in the case of a scan at constant speed in a straight line.
Figure 1B:
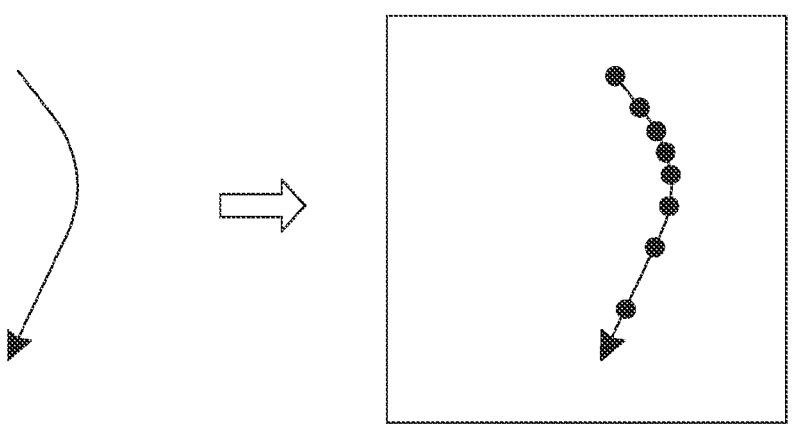
FIG. 1b illustrates schematically a finger scan and related set of sample locations in the case of a scan at varying speed along an arbitrary curve.
Figure 1C:
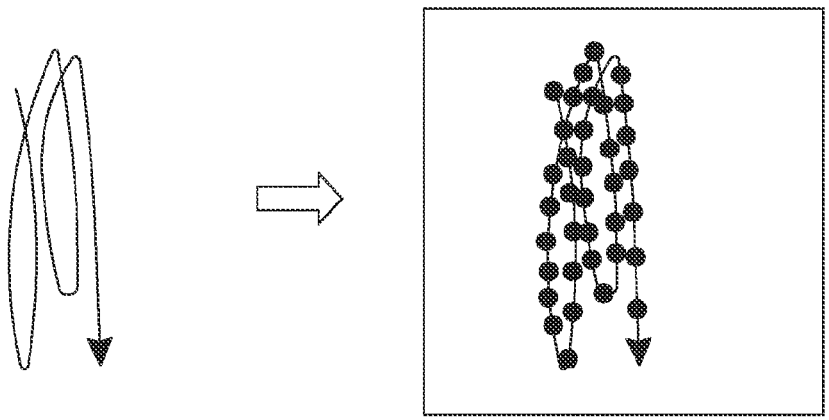
FIG. 1c illustrates schematically a finger scan and related set of sample locations in the case of a series of scans.

In the following, the extreme situation, whereby a swipe sensor with only a single cell is used. From this, it will be clear how the described method can be applied to sensors with multiple cells. FIG. 1 illustrates three examples schematically. FIG. 1a shows the case where a user's finger is moved vertically with a constant speed along a straight line. The samples taken are equi-distant. FIG. 1b shows the movement of the finger at varying speed along an arbitrary curve. Finally, FIG. 1c shows the case where the finger is moved to and fro vertically in combination with some horizontal movement. The samples in this case are somewhat arbitrarily distributed.

Figure 2:
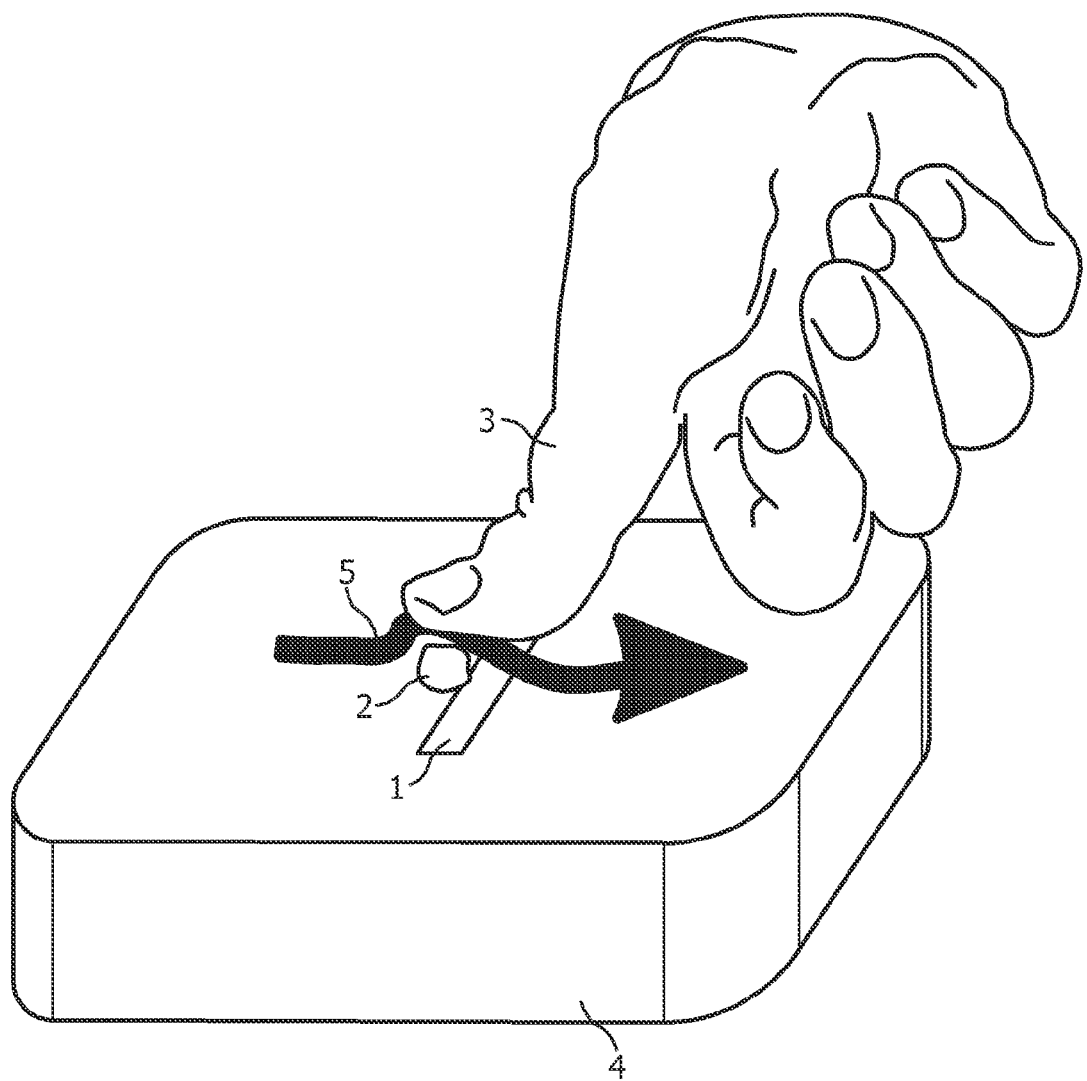
FIG. 2 is a schematic diagram illustrating a fingerprint recognition system according to an exemplary embodiment of the present invention.

FIG. 2 shows an example of embodiment comprising a line sensor or strip sensor (1) and an optoelectronic speed sensor (2)—of which only the part projecting out of the device housing (4) can be seen here. A finger (3) is placed with its tip under a slight pressing pressure on the surface of the housing (4) and drawn over the speed sensor (2) and the line or strip sensor (1).

A regular image with orthogonally equidistant image points is produced only if a rectilinear movement with a reproducible and constant speed takes place transversely with respect to the strip sensor. This can only be approximated to a limited extent by the finger movement. Instead, a somewhat curved, non-uniform movement (5) of varying speed is typical.

In accordance with the present invention, means are provided in order to determine if sufficient image data has been captured and to indicate same to a user, and a number of alternative methods of implementing this feature will now be described.

1. Cell Measures

Figure 3:
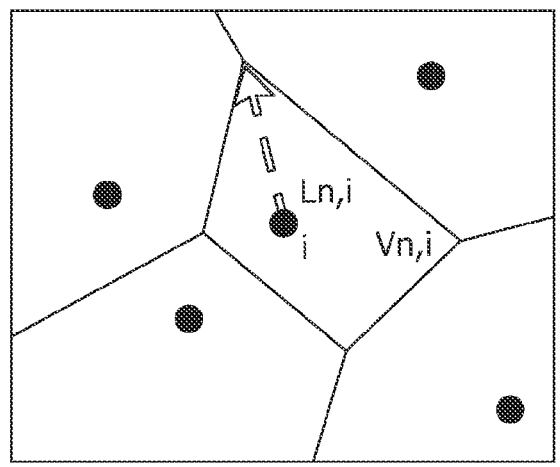
FIG. 3 is a schematic diagram illustrating a Voronoi cell $V_i$ with length $L_i$ for sample i at moment n.

At every moment during a scan it is possible to determine the Voronoi cells for the available samples, see FIG. 3. At moment n the Voronoi cell that is defined around sample i is referred to as $V_{n,i}$. The maximum distance between sample i and any of the vertices of cell $V_{n,i}$ is called $L_{n,i}$. As more samples are measured, the number of Voronoi cells will increase and possibly reduce length $L_{n,i}$ of the previously calculated Voronoi cell i.e. $L_{n,i} \leq L_{n+1,i}$. Next a threshold T can be introduced such that if for all i holds $L_{n,i} \leq T$ or $\forall_i :: L_{n,i} \leq T$, sufficient samples are obtained and the scanning may be terminated.

The threshold value may be constant over the complete image (T) but it may also depend on the region or sample ($T_i$).

In that case the scanning is ready if $\forall_i:: L_{n,i} \leq T_i$ holds. T is determined according to the quality of the image required to be reproduced. It is clear that the availability of all samples enables an optimal processing. In practice missing samples is not a problem because interpolation is in that case very suitable except in the case that many samples are missing. In general the maximum allowable number of missing samples depends on the strived for image quality, the location of the missing samples and the applied interpolation algorithms and therefore the choice of the appropriate threshold is very much dependent on the situation.

2. Counting Samples in Regions

Figure 4:
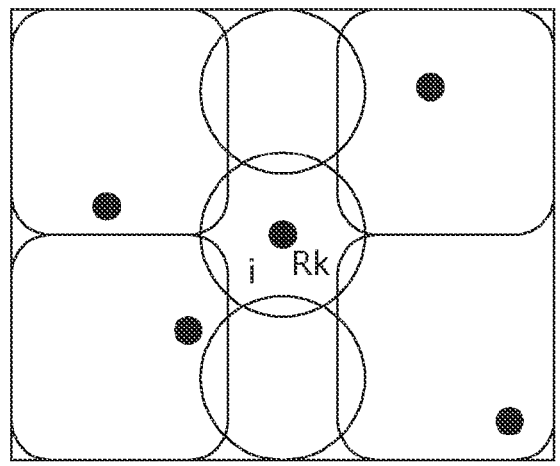
FIG. 4 is a schematic diagram illustrating a predefined region $R_k$ containing a number of samples $N_k=1$.

Another approach is that over the image a series of regions $R_k$ are defined that may be overlapping and/or different in size and shape. For each of these areas the number of samples $N_k$ it contains is counted, see FIG. 4.

If in sufficient areas (i.e. $k \geq k_{min}$) sufficient samples are obtained ($\forall_k :: N_k \geq N_{min}$) the scanning process may be terminated.

3. Pixel Map

Figure 5:
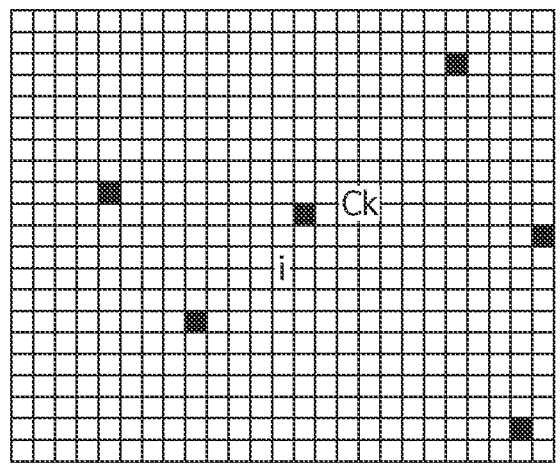
FIG. 5 is a schematic diagram illustrating a pixelmap with pixel $C_k$ containing a number of samples $N_k=1$.

A similar approach for determining whether the scan is ready, is by defining a pixel map over the image, FIG. 5. The same criteria holds for k and $N_k$. In fact, the location of each sample i is quantized to e.g. the centre of a region $R_k$.

Note that in many systems it can be accepted that a small number of samples is missing, and interpolation can be used to overcome this potential problem. In that case, the scanning can be terminated before e.g. $\forall_k :: N_k \geq N_{min}$), in case of counting samples in regions.

On basis of the length measure or the sample counting a "scan is ready" signal can be generated expressing that sufficient data is captured and that the scanning can be terminated. In addition to the "scan is ready" signal it is possible to generate control signals that assist the user in moving the finger over the sensor such that those parts of the finger where additional samples are needed, are presented to the sensor. The locations of cells with too large lengths or regions with not enough samples can be transformed to a signal like "move left", "move right", etc. In addition it is possible to detect that the finger is moved too fast. As a result the signal "move slower" can be generated.

Figure 6:
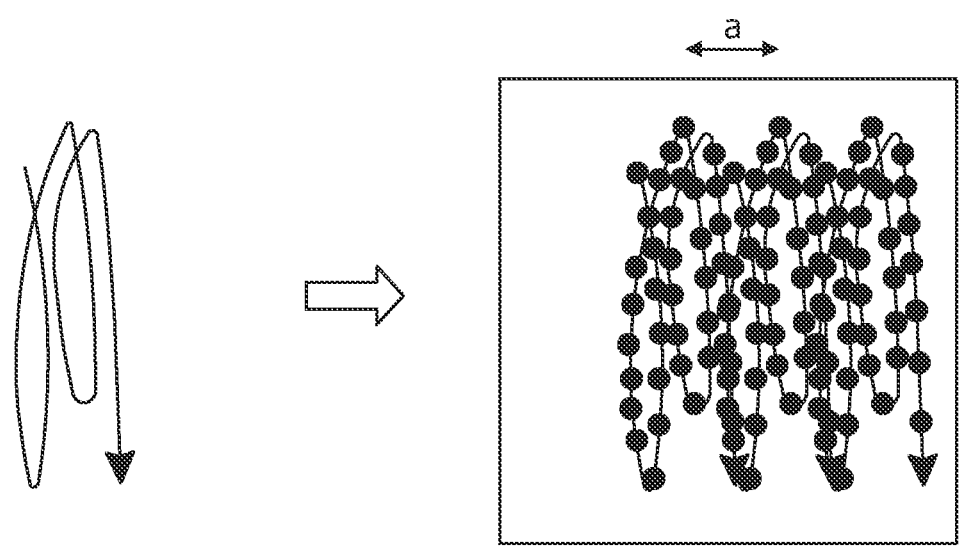

The example in FIG. 6 shows how the samples are located in case three cells are used at distance a.

Note that the strategy as described here is not only applicable to the scanning of fingerprints but also to other modalities. For instance in case of face recognition, a face may be moved and changed in view of a camera until sufficient data is captured. In fact a 2-D camera is used to capture 3-D information. In general the invention can be used in case the dimensionality of the sensor is too low e.g. 1-D instead of 2-D or 2-D instead of 3-D.

In WO2005/024706 it is disclosed that the sensor can perform below-skin measurements to " . . . determine chemical properties from the colour line spectrum of the light component reflected by the finger. It is thus possible, for example, to distinguish between qa living finger and a copy by a determination of the concentration of dissolved and bounded gasses in the blood—such as the blood oxygen content or carbon dioxide content being carried out".

Figure 7:
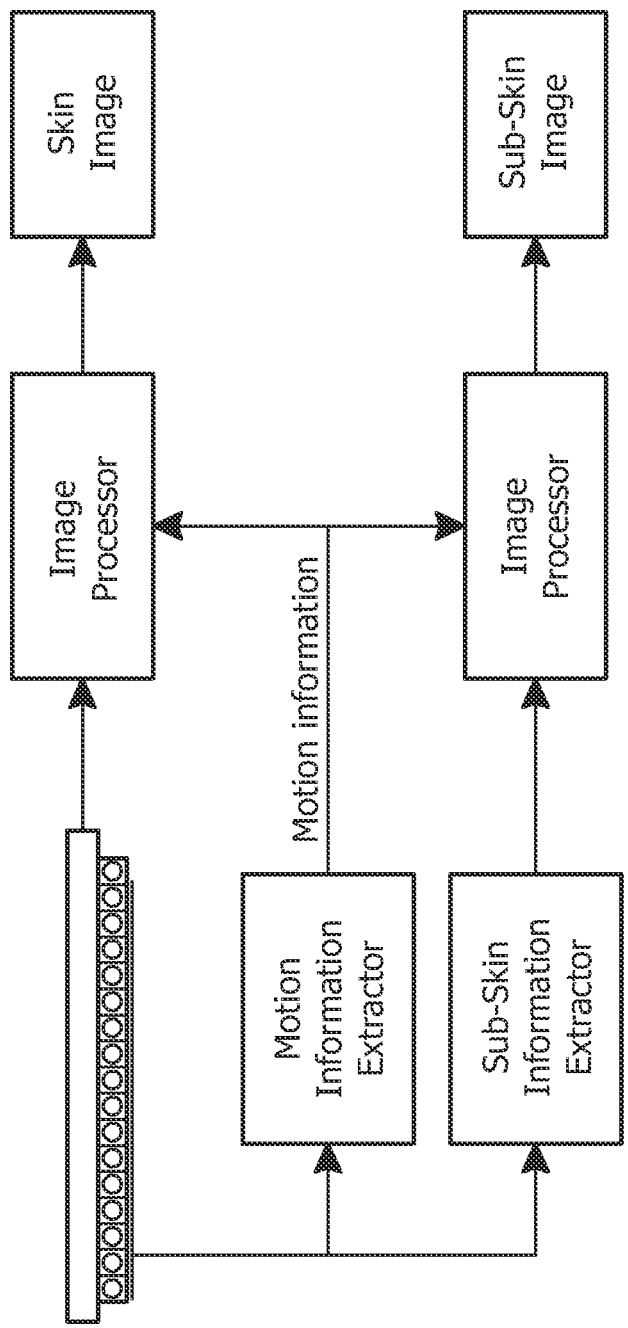
FIG. 7 is a schematic block diagram illustrating the principal components of a system according to an exemplary embodiment of the present invention, showing how the output signal of a laser sensor array can be used to measure sub-skin information such as vein structure.

In addition to this referred method it is possible to make a 2-D sub-skin image. This image may contain information about concentrations of dissolved and bounded gasses in the blood but also information about e.g. the vein structure and dermal papillae. It is expected that this sub-skin information is suitable for user identification. This sub-skin image may also be used to enhance the traditional fingerprint for identification purposes. Since the sub-skin measurement is exposed to the same distortion due to non-perfect scanning of the finger as discussed before, the available motion information can be used here too for controlling the image processor in FIG. 7.

In principle the motion information should describe the motion of the sensor with respect to the sub-skin. However since the distance between the sub-skin and the actually measured surface is very small the resulting error may be acceptable. Moreover this approach reduces the complexity of the sensor system significantly.

Figure 8A:
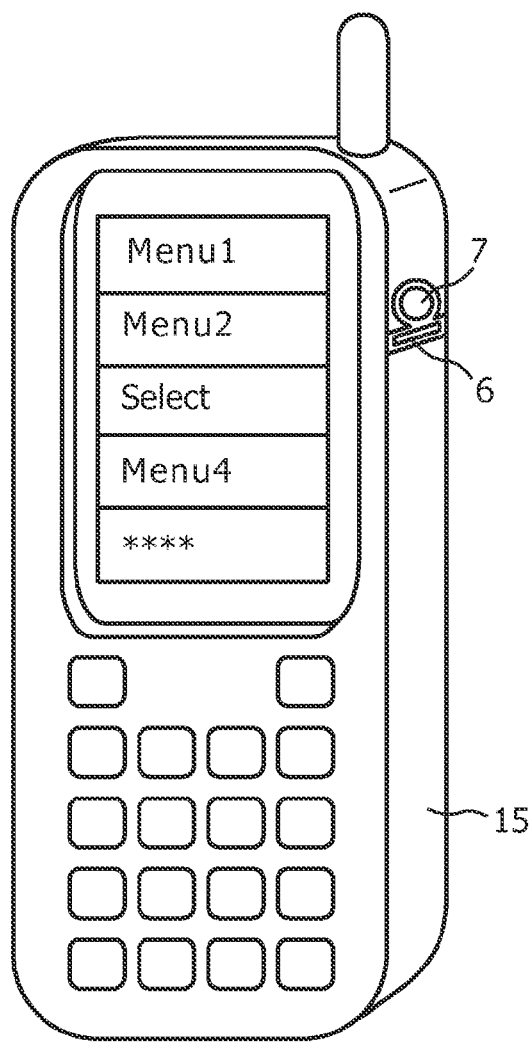
FIG. 8 shows two application examples.
Figure 8B:
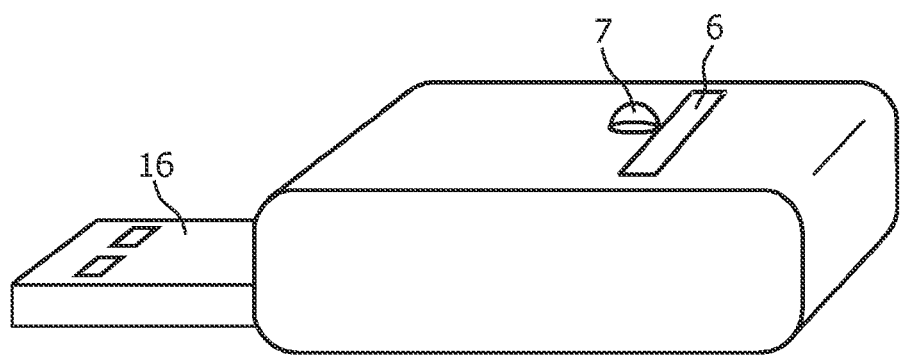

FIGS. 8a and 8b show two applications. The solution according to the invention can be used very advantageously in a mobile telephone (15). In a space-saving unit, the speed sensor (7) and the line sensor (6) are placed on the front side or laterally on the housing. This unit is at the same time an input component for menu control and for the identification system.

A further example is a small authentication device which is activated by the relevant fingerprint. Here, a so-called token (16) with a USB interface is shown, which may be used for PC systems for access control.

Thus the present invention provides two main advantages relative to the prior art, namely:

Improved and adjustable resolution of an image of biometric data;

Improved person recognition by using sub-skin 2D-images.

A first aspect is concerned with keeping track of the positions of the samples obtained by the sensors and informing the user about the progress of sample acquiring by giving signals like "scan is ready", "move finger right", "move slower", etc. Three sampling strategies are explained above that all include a threshold value above or below which the scanning may be stopped because sufficient data have been gathered to obtain a high resolution (finger) image.

The second aspect is concerned with the reliability of person identification via a finger image. For that purpose the invention proposes to make a 2-D sub-skin image comprising information about concentrations of (dissolved and bounded) gasses in the blood, about the vein structure, dermal papillae, etc.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for detecting biometric information in respect of a user, the method comprising acts of:

acquiring by at least one sensor a sample of low resolution image data of a plurality of regions that together make up a unique area of a user body part;

identifying whether the acquired low resolution image data is sufficient to construct a high resolution image in each of the plurality of regions of the unique area; and acquiring one or more further samples of low resolution image data of a given one of the plurality of regions when it is identified that the low resolution image data of the given one the plurality of regions is not sufficient to construct the high resolution image.

2. The method according to claim 1, comprising an act of providing an indication that said acquiring is complete when it is determined that sufficient low resolution image data has been obtained.

3. The method according to claim 1, comprising an act of providing an indication, when it is determined that sufficient samples have not been obtained for the given one of the plurality of regions including at least one of "move left", "move right", "move slower" regarding said body part to be performed by a user in order to facilitate the acquiring of the one or more further samples of the given one of the plurality of regions.

4. The method according to claim 1, comprising an act of determining locations of the plurality of regions of low resolution image data obtained in respect of said body part, wherein a threshold value is defined for each one of the regions which, when reached, indicates that sufficient low resolution image data has been obtained in a corresponding region during said acquiring.

5. The method according to claim 1, wherein each of the plurality of regions comprises a Voronoi cell defined around each element of a sample obtained during the acquiring and sufficient low resolution image data is deemed to have been obtained when the maximum distance between an element of the low resolution image data and any of the vertices of said cell is less than or equal to a predetermined threshold value.

6. The method according to claim 1, wherein a number of elements of the low resolution image data is obtained in each of the plurality of regions, the method comprising an act of comparing the number in each region of the plurality of regions to a threshold to determine if sufficient low resolution image data has been obtained for the constructing.

7. The method according to claim 6, wherein said regions are at least one of overlapping, of varying sizes, and of varying shapes.

8. The method according to claim 1, wherein a pixel map is defined across an image of said user body part acquired during said acquiring, and the number of elements of the low resolution image data obtained in respect of each of one or more of the plurality of regions of said pixel map is determined, to determine if sufficient low resolution image data has been obtained for the constructing.

9. The method according to claim 1, comprising an act of constructing the high resolution image from the acquired low resolution image data when said body part is passed over said sensor one or more times,
wherein the act of constructing the high resolution image comprises an act of interpolating said low resolution image data to compensate for any missing or incomplete data samples.

10. The method according to claim 1, wherein said biometric information is used in user identification including at least one of fingerprint recognition, hand recognition or face recognition.

11. A system for detecting biometric information in respect of a user, the system comprising:
at least one sensor for acquiring a sample of low resolution image data representative of the structure of a plurality of regions that together make up a unique area of a user body part when said body part is passed over said sensor; and
a processor configured to
identify whether the acquired low resolution image data is sufficient to construct a high resolution image in each of the plurality of regions of the unique area, and
acquire one or more further samples of low resolution image data of a given one of the plurality of regions when it is identified that the low resolution image data of the given one of the plurality of regions is not sufficient to construct the high resolution image.

12. A method for detecting biometric information in respect of a user, the method comprising acts of:
acquiring by at least one sensor a sample of low resolution image data representative of a plurality of regions that together make up a structure of a unique area of a user body part;
generating data representative of at least one sub-surface parameter in respect of the body part;
identifying whether the acquired low resolution image data is sufficient to construct a high resolution image in each of the plurality of regions representative of the structure of the unique area;
acquiring one or more further samples of low resolution image data of a given one of the plurality of regions when it is identified that the low resolution image data of the given one of the plurality of regions is not sufficient to construct the high resolution image;
performing user identification using in combination the high resolution image and the image data representative of at least one sub-surface parameter.

13. The method according to claim 12, wherein said high resolution image comprises two-dimensional image data representative of said at least one sub-surface parameter.

14. The method according to claim 12, wherein a speed sensor is provided, the method comprising acts of:
determining movement by the speed sensor of the body part relative to the sensor; and
using the determined finger movement to correct the image representative of the at least one sub-surface parameter that has been distorted as a result of non-uniform movement.

15. The method according to claim 12, wherein the at least one sub-surface parameter comprises one or more of dissolved and bounded gases in the blood, vein structure and dermal papillae.

16. A system for detecting biometric information in respect of a user, the system comprising:
at least one sensor for acquiring a sample of low resolution image data representative of a plurality of regions that together make up a unique area of a user body part; and
a processor configured to
generate image data representative of at least one sub-surface parameter in respect of the body part,
identify whether the acquired low resolution image data is sufficient to construct a high resolution image in each of the plurality of regions, and
acquire one or more further samples of low resolution image data of a given one of the plurality of regions when it is identified that the low resolution image data of the given one of the plurality of regions is not sufficient to construct the high resolution image;
construct a high resolution image of the unique area from of the acquired low resolution image data, and
perform user identification using in combination the high resolution image and the image data representative of the at least one sub-surface parameter.

* * * * *